373-35 SR
9/2/86 OR H 000,128

United States Statutory Invention Registration [19]

[11] Reg. Number: H128

Routt [45] Published: Sep. 2, 1986

[54] JET-CONTROLLED FREEZE VALVE FOR USE IN A GLASS MELTER

[75] Inventor: Kenneth R. Routt, Aiken, S.C.

[73] Assignee: The United States of America as represented by the United States Department of Energy, Washington, D.C.

[21] Appl. No.: 759,774

[22] Filed: Jul. 29, 1985

[51] Int. Cl.[4] ..... C03B 5/26

[52] U.S. Cl. ..... 373/35

[56] References Cited

U.S. PATENT DOCUMENTS 3,524,206 8/1970 Boettner et al. .

3,852,509 12/1974 Rutledge et al. .

*Primary Examiner*—Stephen C. Buczinski

*Assistant Examiner*—Linda J. Wallace

*Attorney, Agent, or Firm*—Allen F. Westerdahl; Judson R. Hightower

[57] ABSTRACT

A drain valve for use in a furnace for the melting of thermoplastic material. The furnace includes a drain cavity formed in its bottom for withdrawing a flow of thermoplastic material. The drain valve includes a flow member which include a flow tube having an inlet and outlet for the material, and coaxially disposed concentric tubular members defining annuli surrounding the flow tube. The tubular members include heating and cooling means for the flow tube. The flow member is adapted to fit in mating relationship in the drain cavity. A freeze valve member is disposed adjacent the outlet of the flow member. The freeze valve member includes heating means and has a plurality of air jets adapted to direct streams of pressurized air at the outlet to control the flow of thermoplastic material through the flow members.

The drain valve can also be used in a furnace of glass melting that includes a drain cavity for withdrawing molten glass from the furnace. The drain valve includes a flow tube member having an inlet and outlet, and having heating and cooling means. The tube member is adapted to fit in mating relationship with the drain cavity. A freeze valve member is disposed at the outlet of the flow tube member. The freeze valve member includes heating means and has a plurality of air jets adapted to direct a stream of pressurized air at the outlet to control the flow of glass through the flow tube member.

6 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

JET-CONTROLLED FREEZE VALVE FOR USE IN A GLASS MELTER

The United States Government has rights in this invention pursuant to Contract No. DE-AC0-9-76SR00001 between the U.S. Department of Energy and E. I. DuPont de Nemours & Co.

BACKGROUND OF THE INVENTION

1. Field of the Invention and Contract Statement

The invention relates to an improved drain valve for a furnace for the melting of thermoplastic material. The invention also relates to an improved drain valve for a furnace for glass melting that has a drain cavity for withdrawing molten glass from the furnace.

2. Discussion of Background and Prior Art

For normal operation of a slurry-fed melter, glass is poured into canisters through the pour spout by either continuous overflow, or by applying a differential pressure between the pour spout and melter plenum. Both pour techniques are acceptable methods of removing the glass from a melter. However, a problem is encountered when as much of the glass as possible must be removed from the melter when it has reached the end of its useful life or prematurely failed. Approximately three canisters of glass could probably be removed by the normal pour technique, however, one to two canisters would remain in the melter. The remaining glass would have to be removed by alternate methods.

The draining of the contents of glass melters (in a canyon environment) has always been a difficult matter, particularly with repeated draining. The basic requirements of a drain technique as applied to a glass melter are: (1) that the drain technique must be capable of draining the molten glass from the glass melter at any time at which solidification of the glass pool appears imminent due to serious equipment or process malfunction; and (2) that the drain technique must also be capable of routinely draining the glass melter whenever the melter reaches the end of its useful life. Typical electrical furnaces for melting glass are those disclosed in U.S. Pat. Nos. 3,524,206 and 3,852,509.

Two drain techniques which have been used by the art are bottom dump valves and evacuated canisters, both of which have encountered difficulties. An evacuated canister can be used to remove glass through the top of the melter. The number of evacuated canisters needed to empty a melter depends on the size of the canister. (Other methods of removing glass through the top of a melter have been proposed, but have not been demonstrated.) Bottom drain techniques can be conveniently divided into two classes, namely, dump valves and freeze valves.

A dump valve can be simply a piece of pipe in the floor of the melter that can be heated to initiate glass flow. When such valve is used, the entire contents in the melter is emptied into only one canister because glass flow cannot be stopped. The oversized dump canister that must be used complicates facility design and processing operation. For this reason, the dump valve is not suited for canyon use.

Dump valves are generally made from a suitable length of pipe, tubing, etc., which passes from the bottom of the melt pool through the glass melter floor. During normal operation the valve is air cooled in order to freeze the glass within it and prevent draining of the glass melter. To initiate glass flow, the air cooling is terminated and the valve is heated by one of several methods to a sufficiently high temperature to permit glass flow. The gravitational force acting on the glass in the melt pool then causes the glass to drain from the glass melter, at least in principle. In practice, considerable difficulty has been encountered in initiating flow through dump valves because of spinel deposits on the melter floor above the valve. Furthermore, even in a melter which is well designed and operated, some deposits are expected to accumulate on the melter floor due to corrosion of refractory sidewalls. Thus, it is uncertain whether flow through a dump valve can be initiated at the end of a projected two year melter lifetime if the valve has been inactive up to that time. By definition, dump valves are not intended to stop the flow of glass once it begins. Thus a suitable means of containing the entire contents of the glass pool must be available. Several standard size canisters are required to contain the entire contents of a typical glass melter. For such reason, dump valves are judged unsuitable for use in many glass melters.

Freeze valves are similar to dump valves except that, by definition, they are capable of stopping the glass flow once it begins, and in principle at least, are suitable for draining a glass melter. For any reasonable choice of freeze valve inside diameter (>0.5 inch) and length (1 to 2 feet), it can easily be shown that for a typical glass pool depth of 2 to 3 feet it is not possible to terminate the glass flow once it begins by simply restoring the air cooling to the freeze valve. Indeed, even if water cooling were used, the required valve length to freeze the glass is unacceptable, and one runs into the additional complications of severe thermal cycling of the valve plus internal pressure surges due to the water flashing to steam within the freeze valve. Only if the glass flow through the freeze valve is very small does it become feasible to refreeze the glass and stop the flow. Thus, some means of controlling the applied pressure drop across the freeze valve is necessary, since such is the controlling variable once flow is initiated.

The art has proposed the method for draining glass out of the bottom of a melter using a jet-controlled freeze valve. Such valve is capable of stopping glass flow. When required, glass flow is stopped by applying air pressure at the mouth of the valve, and then freezing the glass in the valve body using cooling air. The air pressure at the exit is generated by air jets directed at the opening. Such type of valve is simple in design and has no moving parts.

SUMMARY OF THE INVENTION

An object of the invention is to provide an improved drain valve for a furnace for glass melting that has a drain cavity for withdrawing molten glass from the furnace. Another object of the invention is to provide an improved valve for a furnace for the melting of thermoplastic material. Other objects and advantages of the invention are set out herein or are obvious herefrom to one ordinarily skilled in the art.

The objects and advantages of this invention are achieved by the improved drain valve of the invention.

To achieve the foregoing and other objects and in accordance with the purpose of the invention, as embodied and broadly described herein, one embodiment of the invention involves an improved drain valve for a furnace for glass melting that includes a drain cavity for withdrawing molten glass from the furnace. The drain valve includes a flow tube member having an inlet and outlet, and having heating and cooling means. The tube member is adapted to fit in mating relationship with the drain cavity. A freeze valve member is disposed at the outlet of the flow tube member. The freeze valve member includes heating means and has a plurality of air jets adapted to direct a stream of pressurized air at the outlet to control the flow of glass through the flow tube member. The invention drain valve is useful to drain glass melters.

Preferably two air jets are used and most preferably are diametrically opposed in location around the outlet of the flow tube member. Preferably the pool of molten glass is between 2 and 3 feet deep, the furnace is at about atmospheric pressure and the velocity head of the air jets is about 4 psig. Preferably the air jets are directed at the outlet at an angle of about 45 degrees from a horizontal plane at the outlet. Preferably the heating means comprises resistance heaters and the cooling means comprises a flow of cooled air.

The gauge pressure at the top of the freeze valve is primarily determined by the gravitational force acting on the glass pool due to its depth if the glass melter plenum is operated at near atmospheric pressure. Since the gravitational head cannot be easily adjusted, hence the invention method controls the glass flow through the valve by controlling the pressure at the bottom of the valve through a simple, reliable technique which can be used with confidence in a canyon environment.

The technique used for draining molten glass from a glass melter at the end of the melter lifetime is by use of a drain valve installed in the melter floor. Since several canisters are usually required to contain the entire volume of the glass melter, the invention drain valve not only initiates glass flow but also is capable of stopping the glass flow. Since the invention drain valve must be thermally cycled from near room temperature to approximately 1150° C. during operation, the use of valve parts requiring close tolerances to stop glass flow is undesirable due to the possibility of warpage and glass adhering to valve components. The invention valve has eliminated that problem. The invention drain valve must also be used in a remote, radioactive environment. Maintenance and valve removal will therefore be difficult, and thus the use of moving, mechanical parts has been eliminated in the invention drain valve.

The jet controlled freeze valve (drain valve) of the invention has been successfully tested in a small cylindrical glass melter. During normal glass melter operation, glass flow through the valve bore was prevented by the use of an air-cooled annulus which maintained the temperature of the valve bore below the softening point of the glass. To initiate glass flow, the cooling air was turned off and the valve bore was heated by electrical heaters until glass flow began. The glass flow is terminated as desired by two air jets which directed a high-velocity air stream at the bottom of the valve bore. As the air decelerated by impinging on the bottom of the valve bore, an upward force was created which sharply terminated the glass flow. The jets were continuously operated while air flow was re-established in the annulus around the valve bore to cool the valve and solidify the glass. Air flow was then slowly terminated to complete the valve cycle. Since no moving parts or parts with close tolerances were used, the invention valve is especially useful in a glass melter. The invention valve was successfully used twenty eight times to start and stop glass flow.

Another, and broader, embodiment of the invention involves an improved drain valve for a furnace for the melting of thermoplastic material. The furnace includes a drawing cavity formed in its bottom for withdrawing a flow of the thermoplastic material. The drain valve includes a flow member which includes a flow tube having an inlet and outlet for the material, and coaxially disposed concentric tubular members defining annuli surrounding the flow tube. The tubular members include heating and cooling means for the flow tube. The flow member is adapted to fit in mating relationship in the drain cavity. A freeze valve member is disposed adjacent the outlet of the flow member. The freeze valve member includes heating means and has a plurality of air jets adapted to direct streams of pressurized air at the outlet to control the flow of thermoplastic material through the flow members. The freeze valve can be used, for example, in applications where a positive valve is needed for draining thermoplastic material, particularly where remote control is required.

As used herein a thermoplastic material is defined as a material which has the property of softening to a liquid or flowable state when heated and of hardening again when cooled. The thermoplastic material can be, for example, glass or thermoplastic plastics (resins).

Preferably the air jet streams are used to stop the flow of thermoplastic material. Also, preferably the pool of thermoplastic material is between about 2 to 3 feet deep, the furnace is at about atmospheric pressure and the velocity head of the air jets is about 4.0 psig. The air jets are preferably directed at the said outlet at an angle of about 45° from a horizontal plane at the outlet. Preferably the heating means is resistance heaters and the cooling means is a flow of cooled air.

The jet-controlled freeze valve (drain valve) of the invention can be used, for example, on the electrical furnaces of U.S. Pat. Nos. 3,524,206 and 3,852,509, which are used for the melting of thermoplastic materials. The drain valve of the invention can be used with many types of electrical furnaces which are used to melt thermoplastic materials including glass.

By way of summary, jet-controlled freeze valves with heaters can be successfully used to routinely drain glass from the glass melters. The invention allows the use of a freeze/drain valve for emptying glass from the bottom of a melter into several canisters. The freeze valve offers the advantages of having no moving parts and of being usable repeatedly for draining glass from a melter. In one test, glass flow from the invention jet-controlled freeze valve was started and stopped 28 times in ten tests before the heaters failed. Ceramic heaters were used to heat the freeze valve to initiate glass flow. However, ceramic heaters are not durable, so the preferred heating methods are Joule heated Inconel 690 or induction heating. Glass flow from the valve is stopped with air jets until cooling air freezes the glass in the glass flow pipe.

Reference will now be made in detail to the present preferred embodiments of the invention, examples of which are illustrated in the accompanying drawing.

BRIEF DESCRIPTION OF THE DRAWINGS

The accompanying drawings, which are incorporated in and form a part of the specification, illustrate the invention and, together with the description, serve to explain the principles of the invention.

In the drawings.

DETAILED DESCRIPTION OF THE INVENTION

All parts, percentages, ratios and proportions are on a weight basis unless otherwise stated herein or obvious herefrom to one ordinarily skilled in the art.

Figure 1:
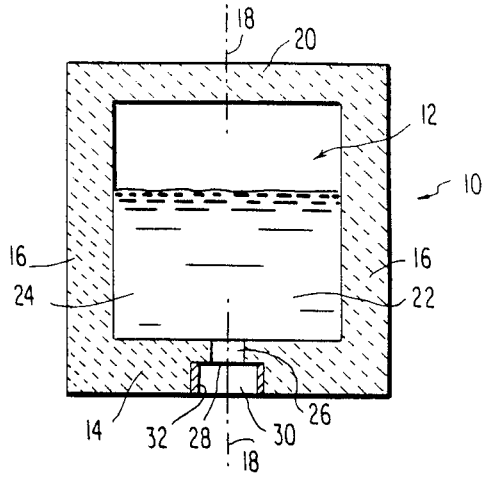
FIG. 1 is a vertical sectional view of a conventional electrical furnace for melting glass which can be used in the invention.

Referring to FIG. 1, furnace 10 is a conventional glass melting furnace. Furnace chamber 12 is generally cylindrical in form (but can have any suitable shape) having a bottom wall 14, top wall 20, and an upstanding peripheral wall 16. Bottom wall 14, peripheral wall 16 and top wall 20 are formed of any suitable refractory material. (The shell walls of furnace 10 are not shown, but they are conventional.) Peripheral wall 16 is symmetrical about center-line 18. Molten glass pool 22 is located in bottom cavity 24 of chamber 12. (The electrodes located in peripheral wall 16 are conventional, are used to melt the glass in furnace chamber 12 and are not shown.)

Figure 2:
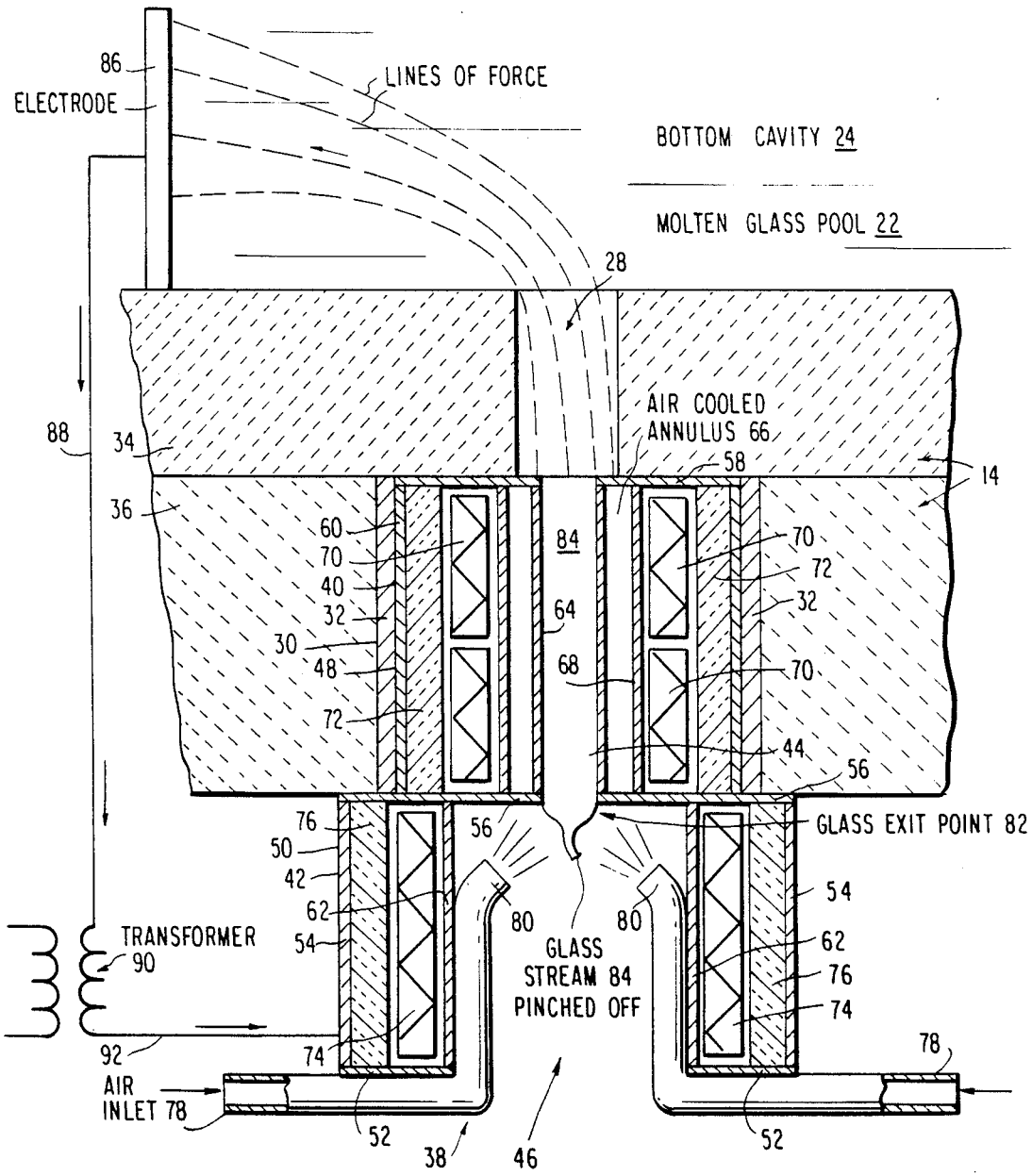
FIG. 2 is a vertical sectional view of a preferred embodiment of the drain valve of the invention mounted in a passageway in the bottom of the electrical furnace, shown in partial vertical section, of FIG. 1.

Passageway 26 in the bottom wall 14 has narrow upper portion 28 and wide bottom portion 30. Drain valve sleeve 32 is located in bottom portion 30 of passageway 26. Referring to FIG. 2, bottom wall 14 is composed of inner refractory wall 34 and outer refractory wall 36.

Drain valve 38 is shown in FIG. 1 mounted in bottom portion 30 in passageway 26. Drain valve 38 has flow tube segment 40 and freeze valve segment 42. Flow tube segment 40 is cylindrical shaped and freeze valve segment 42 is cylindrical shaped. Flow tube segment 40 is hollow (48) and has central passageway 44. Freeze valve segment 42 is hollow (50) and has central passageway 46. Hollow portion 50 of freeze valve segment 42 is composed of metal bottom wall 52, metal outer peripheral wall 54, inner peripheral wall 62 and metal top wall 56. Hollow section 48 is composed of top metal wall 58, metal outer peripheral wall 60, inner peripheral wall 64 and metal bottom wall 56. Metal wall 56 serves as the bottom wall of hollow portion 48 and the top wall of hollow portion 50. Inner peripheral wall 62 is also termed glass flow pipe or tube 62, forms central passageway 44, and is composed of a material such as Inconel 690 which will resist the temperature of the molten glass which flows through it. Flow tube segment 40 fits inside of drain valve sleeve 32. Passageway 44 is narrower than upper portion 28 of passageway 26, whereby a portion of metal upper wall 58 overlaps the bottom of upper portion 28 of passageway 26. Air-cooled annulus 66 in hollow portion 48 is formed by inner peripheral wall 68 located in hollow portion 48.

Figure 4:
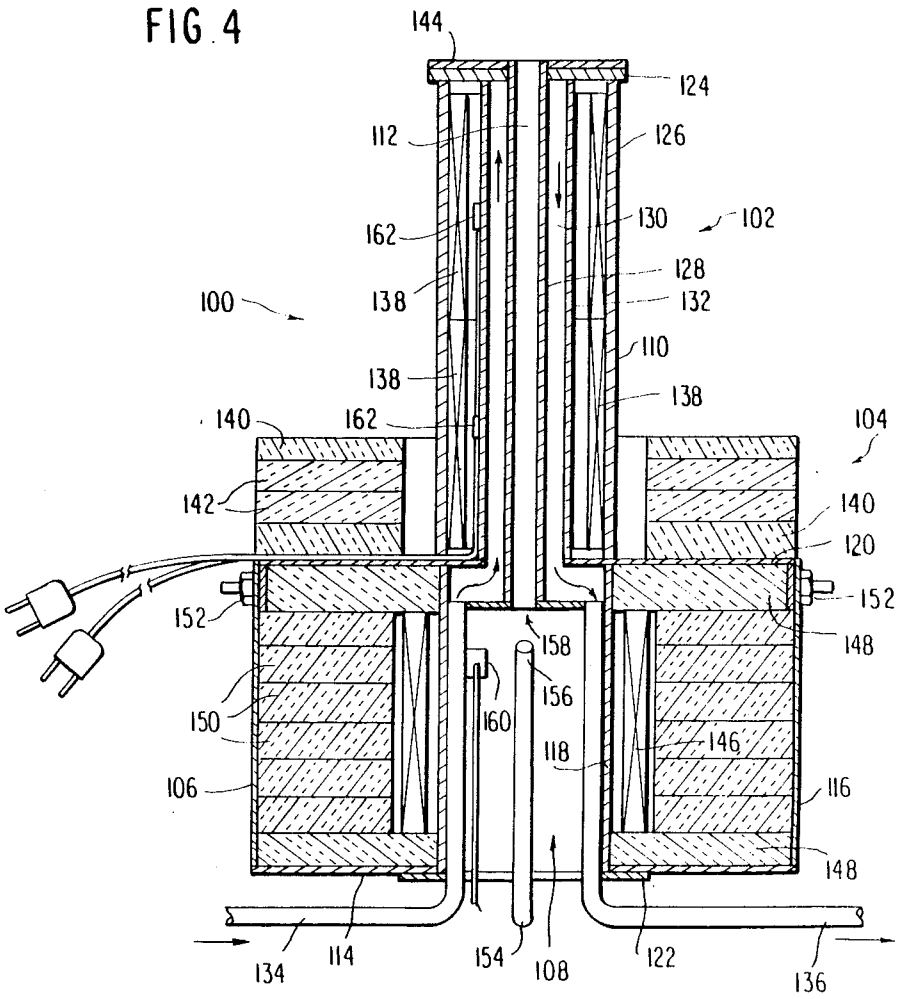
FIG. 4 is a vertical side sectional view of the drain valve of FIG. 3.

Air is introduced into air-cooled annulus 66 via air line 134 in FIG. 4 mounted in bottom wall 56 and exiting via line 136 in FIG. 4. Such air is used to cool the glass in passageway 44 as desired. Ceramic resistance heater 70 is located in the outer part of hollow portion 48 against inner peripheral wall 68. Inner peripheral wall 68 is composed of a material such as Inconel 690 which will resist the heat generated by ceramic resistance heater 70. Ceramic resistance heater is used, if desired, to melt glass in passageway 44 or to keep molten glass in passageway 44 in a molten state. Insulation 72 is located in hollow portion 48 between outer peripheral wall 60 and ceramic resistance heater 70. Ceramic resistance heater 74 is located in hollow portion 50 against inner peripheral wall 62. Inner peripheral wall 62 is composed of a material such as Inconel 690 which will resist the heat generated by ceramic resistance heater 74. Ceramic resistance heater is used to assist in melting glass at bottom wall 56 and to keep molten glass falling through passageway 46 in a molten state. Insulation 76 is located in hollow portion 50 between outer peripheral wall 54 and ceramic resistance heater 74.

Air jet inlets 78 extend along bottom wall 52 up into passageway 46 along inner peripheral wall 62 so that air jets 80 are positioned below the bottom opening (glass exit point 82) of passageway 44. Air jets 80 are angled upwards at a 45 degree angle (preferred) so that the exiting air converges on glass exit point as shown in FIG. 2. When air jets 80 are used, glass stream 84 is pinched off as also shown in FIG. 2. Air jets 80 and the part of air jet lines in contact with hollow portion 50 should be composed of a material such as Inconel 690 which can resist very high temperatures. Preferably a pair of diametrically-opposed air jets 80 are used, although 3, 4, 5, 6 or more air jets can be used (usually equally spaced around the periphery of passageway 46).

Electrode 86 is mounted in refractory wall 34 near upper portion 28 of passageway 26 and extends into molten glass pool 22. Electrode 86 is connected by electrical wire 88 to transformer 90, which is connected by electrical wire 92 to metal outer peripheral wall 54. An electrical pathway is formed by metal outer peripheral wall 54, metal horizontal wall 56, metal outer peripheral wall 60, inner peripheral walls 64 and 68, and metal top wall 58 to the end of metal top wall 58 which overlaps the bottom of top portion 28 of passageway 26. When transformer 90 is turned on, line of force 94 (i.e., electrical current paths) form between the outer metal body of drain valve (i.e., the inner portion of metal upper wall 58) and electrode 86. Lines of force extend up through upper portion 28 and passageway 26 through molten glass pool 22 to electrode 86, as shown in FIG. 2. Thereby, any solidified glass in upper portion 28 of passageway 26 is melted.

In freeze valve 38 the pressure at the bottom of valve 38 is controlled by the velocity head developed by the two air jets 80 directed at exit point 82 of glass stream 84. Valve 38 can be termed a jet controlled freeze valve and operates as follows:

During the normal operation of glass melter 10, glass flow through valve 38 is prevented by keeping heaters 70 off and air flowing through air cooled annulus 66. To initiate glass flow, air flow through annulus 66 is stopped, an electrode pair in the glass pool is switched off and a potential difference established between one electrode 86 of said pair and the metal valve body of drain valve 38. This causes joule heating in the glass in refractory hole 28 at the top of (i.e., just above) valve 38 and softens any deposits on the melter (10) floor near the top of valve 38. Simultaneously, the axial heater zones 70 and 74 in valve 38 are turned on and brought up to power by suitable temperature controllers (not shown). Glass flow through drain valve 38 then begins.

When it is desired to stop the glass flow through drain valve 38, air jets 80 are turned on and used to increase the pressure on molten glass stream 84 at glass exit point 82. For a melter (10) plenum at near atmospheric pressure, the downward forces on glass stream 84 are gravity (about 3.0 psig maximum—i.e., approximately 1.0 psig per foot of glass depth) and the inertial force caused by deceleration of glass stream 84 (less than 1.0 psig—computed to be 0.4 psig to stop the glass flow in 0.5 secs. during the recent draining of the melter) as it is stopped. Neglecting friction, the upward force necessary to stop the glass flow is generated by the velocity head of the two air jets 80, and must thus be on the order of 4.0 psig. This is easily achieved by the invention air jets.

Once the glass flow is stopped, the remaining glass in valve 38 is resolidified by restoring the air flow in annulus 66 around inner peripheral wall 64. Heating devices 70 used to initiate glass flow can be switched off before or after air jets 80 are used.

Valve 80 is not usually subject to pluggage at its top from deposits forming on the melter (10) floor. If such problem arises, it can be eliminated by periodically draining small quantities of glass through valve 38. This in turn would require that valve 38 be successfully operated through several cycles during the lifetime of melter 10. Repeated cycling of valve 38 could mean that its lifetime is limited by the choice of heaters 80 used around valve 38. Three useful types of heaters 80 are ceramic resistance heaters, induction heaters, and resistance heated Inconel 690 (preferred).

Figure 3:
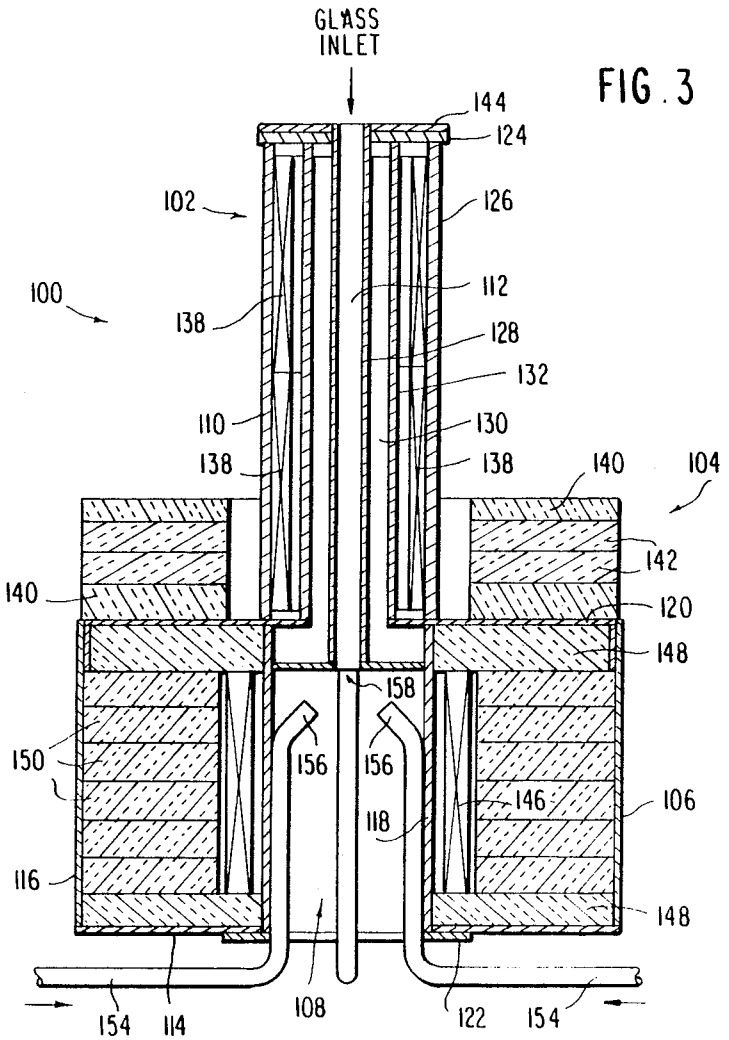
FIG. 3 is a vertical front sectional view of another preferred embodiment of the drain valve of the invention.

FIGS. 3 and 4 show another version of the drain valve (100) of the invention. FIG. 3 is a north-south section, with north to the right. FIG. 4 is a west-east section, with east to the right. Drain valve 100 has flow tube segment 102 and freeze valve segment 104. Flow tube segment 102 is cylindrical shaped and freeze valve section 104 is cyclindrical shaped. Flow tube segment 102 is hollow (110) and has central passageway 112. Freeze valve segment 104 is hollow (106) and has central passageway 108. Hollow section 106 freeze valve section 104 is composed of metal bottom wall 114, metal outer peripheral wall 116, inner peripheral wall 118 and metal top wall 120. Washer-shaped sheet 122 is centered on passageway 108 and is located on bottom wall 114. Hollow portion 110 is composed of metal top wall 124, metal outer peripheral wall 126, inner peripheral wall 128 and metal bottom wall 120. (Outer wall 126 is typically a 2 inch Schedule 40, 12.63 inches long.) Metal wall 120 serves as the bottom wall of hollow portion 110 and the top wall of hollow portion 106. Inner peripheral wall 128 is also termed glass flow pipe or tube 128, forms central passageway 112 and is composed of a material such as Inconel 690 which will resist the temperature of the molten glass which flows through it.

Flow tube section fits inside of a drain valve sleeve (not shown) in a glass-melting furnace (not shown).

Air-cooled annuli 130 in hollow portion 110 is formed by inner peripheral wall 132 located in hollow portion 110. Air is introduced into and removed from air-cooled annuli 130 via air lines 134 and 136. Such air is used to cool the glass in passageway 112 as desired. (Glass flow pipe 128 is typically a ¾ inch schedule 40 pipe, 13.88 inches long. Welded to pipe 128 are the two vertical air flow vanes or annuli 130. Vanes 130 guide the cooling air flow up one side and down the other side.) Ceramic resistance heater 138 is located in the other portion of hollow portion 110 against inner peripheral wall 132. Inner peripheral wall 132 is composed of a material such as Inconel 690 which will resist the heat generated by ceramic resistance heater 138. Ceramic resistance heater 138 is used to melt glass in passageway 112 or to keep molten glass in passageway 112 in a molten state. Because of the vertical temperature gradient that exists, the upper portion 110 is divided into two independent heating zones. Heat to each zone is supplied by two heaters 138 (e.g., Thermcraft ceramic heaters, 3 inch I.D.×3-15/16 inch O.D.×6 inch LG, rated at 620 watts). Each zone is controlled by one, e.g., type K thermocouple (162) and a proportional temperature controller (not shown). Insulation blankets 140 and insulating board 142 is located on top of horizontal wall 120 and around outer peripheral wall 126. Washer-shaped gasket 144 is located on top of top wall 124. Ceramic resistance heater 146 is located in hollow section 106 against inner peripheral wall 118. Heaters 146 of air jet section 106 are typically two half cylinder Thermcraft heaters, 5 inch I.D.×6½ inch O.D.×6 inch LG, rated at 1060 watts. The temperature of the zone is controlled, for example, by a Type K thermocouple and a proportional controller (not shown). Heat in this area is required to melt the glass at the mouth of the glass flow pipe 128 and to melt any glass that may adhere to the side walls of the freeze valve. Inner peripheral wall 118 is composed of a material such as Inconel 690 which will resist the heat generated by ceramic resistance heater 146. Ceramic resistance heater 146 is used, if desired, to keep molten glass falling through passageway 108 in a molten state. Insulating blankets 148 and insulating boards 150 are located in hollow portion 106 between outer peripheral wall 116 and ceramic resistance heater 146. Valve 100 is held together by bolt 152 (two end nuts).

Air jet inlets 154 extend along bottom wall 114 up into passageway 108 along inner peripheral wall 118 so that air jets 156 are positioned below the bottom opening (glass exit point 158) of passageway 112. Air jets 156 are angled upwards at a 45 degree angle (preferred) so that the exiting air converges on glass exit point 158 as shown in FIG. 3. When air jets 156 are used, the glass stream exiting from passageway 112 is pinched off. Air jets 156 and the portion of air jet lines in contact with hollow section 108 should be composed of a material such as Inconel 690 which can resist very high temperatures. Preferably a pair of diametrically-opposed air jets 156 are used, although 3, 4, 5, 6 or more air jets can be used (usually equally spaced around the periphery of passageway 108). To repeat, in order to terminate glass flow, two air jets 154 are directed at the bottom of glass flow pipe 112 (see FIG. 3). Air jets 154 are oriented such that the vector sum of the forces provided by the two air streams is directed upward into the flow pipe 112. Deceleration of the air flow streams as they impinge on the bottom of the glass flow pipe 112 stops the glass flow.

Welded-pad thermocouple 160 is located on the inner side of inner peripheral wall 118, as shown in FIG. 4. Welded-pad thermopcouples 162 are located on the side of peripheral wall 132 towards ceramic resistance heater 132, as shown in FIG. 4. The plugs and lead lines of thermocouples 162 are also shown in FIG. 4.

A freeze valve transformer is used in conjunction with valve 100 in the same manner as is shown in FIG. 2 as is freeze valve transformer 90 for valve 38.

FIG. 3, shows the glass flow and freeze pipe section of drain valve 100; and FIG. 4 shows the air jet section of drain valve 100.

All of the metal parts of freeze valve 100 are preferably made of Inconel 690 because of glass contact and the high operating temperatures (700° to 1150° C.).

Valve 100 can be installed in melter 10 (shown in FIG. 1) by attaching it to threaded bolts extending down from drain valve sleeve 32. Sleeve 32 is a permanently installed device in the melter bottom which is designed to permit testing of multiple freeze/drain valves over the life of melter 10. The top of the valve is, for example, 6 inches below the bottom of glass pool 22. Because sleeve 32 is made of Inconel 690 it could not be located on the melter floor, i.e., sleeve 32 would occupy approximately 14 percent of the floor area and disrupt the electrical fields. Therefore, it was necessary to provide a method of heating the glass in hole 28 in (Monofrax K-3) brick 34. This was accomplished by attaching an electrical lead to the outside of the freeze valve (at 58) so that current could flow from the valve body up through the glass in the hole above the drain valve sleeve and then to the throat electrode. This circuit is energized only when it is desired to operate the freeze valve.

Testing of jet controlled freeze valve 100 was conducted using glass composition which was Frit-131 plus simulation-2 waste. Ten freeze valve tests were conducted, with valve 100 cycled (glass flow initiation and termination) 28 times during this period. Table I as follows summarizes the dates and number of cycles per test:

TABLE I

FREEZE VALVE TESTS

JET CONTROLLED FREEZE VALVE (100 WITH CERAMIC HEATERS)

Began Heatup Melter
Began slurry feeding
First Freeze Valve Test - 7 cycles
Second Test - 3 cycles
Third Test - 2 cycles
Fourth Test - 2 cycles
Fifth Test - 2 cycles
Sixth Test - 3 cycles
Seventh Test - 2 cycles
Eighth Test - 2 cycles
Ninth Test - 2 cycles
Tenth Test - 3 cycles
End Campaign 10 Tests - 28 Cycles In the first freeze valve test, glass began to flow from the bottom of valve 100 approximately 50 minutes after the heaters were turned on and approximately 20 minutes after firing from freeze valve 100 to throat electrode 82 began. Temperatures ranged from 780° to 730° C. Valve 100 was cycled five times in the first test to demonstrate that valve 100 could be repeatedly used. To drain the glass from melter 10, freeze valve 100 would have to be cycled five times. Glass flow cutoff for the first five cycles was clean. After the sixth cycle, a thin strip of glass, slightly off center, extended below valve 100. When glass flow was initiated for the seventh time, the molten glass stream was diverted causing some glass to build up on the wall of the air jet zone. Flow cutoff was somewhat messy. After the seventh cycle, the test was terminated.

Approximately 25 psig is required to stop glass flow for freeze valve 100 setup. In the first test, the pressure gages at the rotameters indicated that between 20 and 30 psig was needed to stop the glass flow. Test 2 and 3 confirmed that 25 to 30 psig was required to stop the glass flow with a full tank of glass. As the level of glass in melter 10 dropped, the pressure required to stop the glass flow decreased, as expected. Another observation made after the first test was completed was that glass could be blown up into the plenum of melter 10 if too much pressure was used to stop the glass flow. When air pressure greater than 30 psig was used, glass was blown up into the melter plenum.

In tests 3 through 10, glass cutoff for many of the cylces was not as clean as desired. As a result glass accumulated around the exit of valve 100 and solidified. The glass had to be mechanically removed. This was caused by independent air flow control and by air jet misalignment. The misalignment was attributed to the use of relatively thin wall ½ inch tubing and repeated heat cycling of the ½ inch Inconel 690 tubing. In test 10, both air jets were connected to the same rotameter. Also, a ¼ turn ball valve was placed at the discharge of the rotameter. Before the test began the air pressure and flow rate were preset with a globe valve located at the inlet to the rotameter and the ball valve open. When flow was to be terminated, the ball valve was opened providing instantaneous balanced air flow to the valve. Glass flow cutoff was improved considerably.

At the start of the eleventh freeze valve test, some of the heaters could not be energized. However, the test was continued to determine if such zone heaters were necessary. Unfortunately when the temperature reached approximately 800° C. other zone heaters also failed and the test had to be terminated.

In general, glass began to flow from valve 100 about one hour after the ceramic heaters were energized. The temperature in all three heater zones averaged between 700° and 800° C. The diameter of the glass stream was between ¼ and ⅜ inch. Approximately 3 psig of air pressure at the mouth of valve 100 was needed to stop glass flow with the jets properly aligned.

In 9 out of 10 tests, it was necessary to electrically fire from freeze valve 100 to throat electrode 82 for a period of 10 to 30 minutes to initiate glass flow. In the tenth and final test the drain valve sleeve cooling air had been turned off for several days. As a result, the temperatures in the drain hole area were much higher. Glass flow through the freeze valve was initiated without firing from the freeze valve to the throat electrode.

At the end of the testing, jet controlled freeze valve 100 was removed to determine the reason for failure of the ceramic heaters. It was learned that one of the two nuts holding the top portion in position had failed because of the high temperature cycling. This allowed valve 100 to slip down creating a gap between valve 100 and sleeve 32. Apparently, during several of the tests glass migrated between sleeve 32 and valve 100 and reached the ceramic heaters causing them to eventually short circuit. The ceramic heaters may have lasted longer if they had been better protected.

Jet controlled freeze valve 100 with ceramic heaters was successfully cycled 28 times. A maximum of seven cycles were performed in one test. For clean glass flow cutoff, the air jets must be properly aligned with the mouth of the glass flow pipe. Also air flow to each jet must be balanced. If the air jets were slightly misaligned or air flow unbalanced, glass will be swirled and the flow cut-off will not be clean with potential build-up on the wall.

Ceramic heaters were used in the freeze valve because of their availability, although Joule heated Inconel 690 heaters and induction heaters are more durable heating methods.

Although it was not necessary to fire from the freeze valve to the throat electrode in the final test of the ceramic heated freeze valve, it has been necessary when using an induction heated freeze valve. The temperature around the drain hole is lower (approximately 360° C. versus 530° C.) because of the water cooled induction with this valve coil.

Glass flow from the freeze valve in the melter can be stopped with air jets. In the event that air pressure cannot completely stop the glass flow, a mechanical knife gate valve could be placed beneath the freeze valve.

By way of summary, the invention involves a freeze valve designed for use in the drain cavity of a glass melter in which pressure at the bottom of the valve is controlled by the velocity head developed by air jets directed at the exit point of the glass stream.

The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A drain valve for controlling the flow of glass from a furnace for glass melting that includes a drain cavity, which comprises:

(a) a flow tube member having an inlet and an outlet, and including heating means and cooling means, said tube member being adapted to fit in mating relationship with said drain cavity; and (b) a freeze valve member disposed at said outlet of said valve member including heating means and a plurality of air jets, said air jets being adapted to direct a stream of pressurized air at said outlet to control the flow of said molten glass through said flow tube member.

2. The drain valve as claimed in claim 1 wherein two of said air jets are present.

3. The drain valve as claimed in claim 1 wherein said air jet streams are used to stop the flow of said molten glass.

4. The drain valve as claimed in claim 3 wherein said pool of said molten glass is between about 2 and 3 feet deep, said furnace is at about atmospheric pressure and the velocity head of said air jets is about 4 psig.

5. The drain valve as claimed in claim 4 wherein said air jets are directed at said outlet at an angle of about 45 degrees from a horizontal plane at said outlet.

6. The drain valve as claimed in claim 1 wherein said heating means comprises resistance heaters and said cooling means comprises a flow of cooled air.

* * * * *